US006884352B1

(12) United States Patent
Kennedy

(10) Patent No.: US 6,884,352 B1
(45) Date of Patent: Apr. 26, 2005

(54) TREATING TOXIC SOLVENTS AND HEAVY METAL CONTAMINANTS IN GROUNDWATER AND SOIL USING IRON SULFIDES MICROBIAL GEOCHEMICAL TREATMENT ZONE

(76) Inventor: Lonnie G. Kennedy, 3233 NW. 63rd St., Oklahoma City, OK (US) 73116

( * ) Notice: Subject to any disclaimer, the term of this patent is extended or adjusted under 35 U.S.C. 154(b) by 160 days.

(21) Appl. No.: 10/367,461

(22) Filed: Feb. 14, 2003

Related U.S. Application Data
(60) Provisional application No. 60/362,521, filed on Mar. 7, 2002.

(51) Int. Cl.$^7$ ................................................ C02F 3/00
(52) U.S. Cl. ...................... 210/610; 210/747; 210/912
(58) Field of Search ............................... 210/610, 631, 210/747, 912–914, 170

(56) References Cited

U.S. PATENT DOCUMENTS

| | | |
|---|---|---|
| 5,043,076 A | 8/1991 | Alexander |
| 5,057,227 A | 10/1991 | Cohen |
| 5,362,402 A | 11/1994 | Haitko |
| 5,427,692 A | 6/1995 | Thornton |
| 5,833,855 A * | 11/1998 | Saunders .................... 210/611 |
| 5,897,778 A | 4/1999 | Ishimori |
| 6,068,777 A | 5/2000 | Kimura |
| RE36,915 E | 10/2000 | Suciu |

OTHER PUBLICATIONS

Parker, Tim and Mohr, Tom; Symposium on Natural Attenuation of Chlorinated Solvents in Groundwater—A Summary; Hydro Vision Online Newsletter, vol. 5, No. 4; Winter 1996.

Butler, Elizabeth C, and Hayes, Kim F.; Kinetics of the Transformation of Trichlore Ethylene and Tetrachlore–Ethylene by Iron Sulfide; Environmental Science Technology, vol. 33(12), pp. 2021–2027; 1999.

Kennedy, Lonnie G. and Everett, Jess W., Microbial Degredation of Simulated Landfill Leachate: Solid iron/sulfur interactions; Applied Environmental Research, vol. 5, No. 2, pp. 103–116; May, 2001.

* cited by examiner

*Primary Examiner*—Chester T. Barry
(74) *Attorney, Agent, or Firm*—Randal D. Homburg

(57) ABSTRACT

A method a process involving the application of a labile organic substrate, with supplied sulfate as needed, to a soil and ground water supply for the express purpose of stimulating sulfate reduction to facilitate the formation of mineral iron sulfides or other reduced reactive minerals, abiotically treats soil contaminants, including chlorinated solvents, and hexavalent chromium, with an iron monosulfide microbial geochemical treatment zone. Other iron sulfide compounds, or generally $Fe_xS_y$, may also comprise the treatment zone in addition to iron monosulfide. The process also includes, in some cases, the supplementation of sulfate to ground water where insufficient natural supply exists, wherein a solution of organic and dissolved reactive sulfate introduced to the soil and ground water, the introduction of sulfate tailored to the individual site conditions to meet contaminant mass constraints.

10 Claims, 6 Drawing Sheets

TREATING TOXIC SOLVENTS AND HEAVY METAL CONTAMINANTS IN GROUNDWATER AND SOIL USING IRON SULFIDES MICROBIAL GEOCHEMICAL TREATMENT ZONE

CROSS REFERENCE TO RELATED APPLICATIONS

Applicant claims the benefit of the provisional patent application Ser. No. 60/362,521 filed on Mar. 7, 2002.

BACKGROUND OF INVENTION

1. Field of the Invention

A method a process involving the application of a labile organic substrate, and optionally sulfate, to a soil and ground water supply for the express purpose of stimulating reactive sulfate reduction to facilitate the formation of mineral iron sulfides that abiotically treats soil contaminants, including chlorinated compounds, and hexavalent chromium or other oxidized or partially oxidized organic and inorganic contaminants, with an iron sulfide microbial geochemical treatment zone. Other iron sulfide compounds, or generally $Fe_xS_y$, may also comprise the treatment zone in addition to iron monosulfide including activated iron or other metals which may be formed by microbial geochemical processes. The process also includes, in some cases, the supplementation of reactive sulfate to ground water where insufficient natural supply exists, wherein a solution of organic and dissolved reactive sulfate introduced to the soil and ground water, the introduction of reactive sulfate tailored to the individual site conditions to meet contaminant mass constraints.

2. Description of Prior Art

The following United States patents are identified and disclosed herein. Several devices are disclosed relating to the chemical treatment of ground and water contaminants, but none of them are or may be adapted to define the stated method or process of the current invention, nor do they utilize the same chemicals, reactions and process a does the current invention.

In U.S. Pat. No. 5,362,402 to Haitko, a method for the dehalogenation of halongenated hydrocarbons using metallic iron in the presence of citric acid, primarily in aqueous solutions. Addition of agitated iron particles in an aqueous solution containing hexavalent and trivalent chromium forming an insoluble precipitate is the objective of the disclosed method of U.S. Pat. No. 5,380,441 to Thornton, and also the relative subject matter of U.S. Pat. No. 5,427,692 to Thornton, but including the use of barium nitrate.

Use of iron powder and a water soluble weak acid inorganic compound which does not contain nitrogen or phosphorus to decontaminate soil infused with a halogenated organic compound is disclosed in U.S. Pat. No. 6,068,777 to Kimura, which is adapted primarily for the treatment of groundwater. Hexavalent chromium is the target contaminant in the method and process in U.S. Pat. No. RE 36,915 to Suciu, which uses the addition of a ferrous ion and a sulfide ion to a stream of waste water prior to disposal reducing the hexavalent chromium to trivalent chromium, which forms a precipitate in the waste water creating a sludge, the process also including the addition of a flocculating polymer to induce the formation of the precipitant.

Also disclosed are three articles, the first co-authored by the inventor, indicated as follows. In a first article, (Kennedy, L. G. and Everett, J. W., 2001. Microbial degradation of simulated landfill leachate: Solid iron/sulfur interactions; Applied Environmental Research, Vol. 5, No. 2, pgs. 103–116.) the focus of the article dealt primarily with the formation of reduced iron and sulphur minerals to assess organic contaminant degradation due to $Fe^{+3}$ and $SO_4^{2-}$ microbial reduction process, but did not disclose any resultant method or process dealing with chlorinated solvent reduction in the soil or groundwater.

In the article by Butler, E. C. and Hayes, K. F., 1999. Kinetics of the transformation of trichloroethylene and tetrachloroethylene by iron sulfide; Environmental Science Technology, Vol. 33, No. 12, pgs. 2021–2027, laboratory process for the degradation of PCE an TCE are discussed, but without disclosure of a method or process for naturally forming the iron sulfide using the disclosed process creating the iron sulfide barrier as a microbial geochemical treatment zone. Another collaterally related scholarly article is found in the article, Parker, T. and Mohr, T., Symposium on natural attenuation of chlorinated solvents in groundwater—a summary; Hydro Vision Online Newsletter, Volume 5, No. 4, Winter 1996; www.grac.org/winter96/rnapaper.htm, dealing with chlorinated solvent plume movement, migration and activity.

In Applicant's article, See Kennedy, supra., preliminary research and testing is documented dealing with the use of solid electron acceptors, including $CaSO_4^{2-}$ and $Fe(OH)_3$, to promote carbonate and sulfide mineral formation to control greenhouse gas production, including carbon dioxide and methane, with the suggestion that the Fe and S mineral could also be used to assess organic contaminant degradation occurring due to $Fe^{3+}$ and $SO_4^{2-}$ microbial reduction processes for natural attenuation studies. The current invention is a result of such studies, and is the method for creating an iron monosulfide (FeS) microbial geochemical treatment zone for areas having previously experienced soil and ground contamination with toxic chemical solvents and by-products.

SUMMARY OF THE INVENTION

The primary objective of the invention is to create a soil retentive barrier of iron sulfides to reductively dechlorinate polychlorinated hydrocarbons through an abiotic chemical reaction by the formation of an iron sulfide or iron monosulfide microbial geochemical treatment zone.

The secondary objective of the invention is to provide a naturally occurring sulfate reducing heterotrophic soil bacteria oxidizing the organic while reducing the reactive sulfate, which, in turn causes a liberated reactive hydrogen sulfide combining with iron, to form iron sulfides which oxidizes chlorinated chemicals including solvents to form non-toxic by-products.

A third objective of the invention is to apply this process to toxic metallic compounds, including hexavalent chromium, to form non-toxic by-products from the redox reactions with FeS or, in general, $Fe_xS_y$.

DESCRIPTION OF THE DRAWINGS

The following drawings are informal drawings submitted with this provisional patent application.

DESCRIPTION OF THE PREFERRED EMBODIMENT

Figure 1:
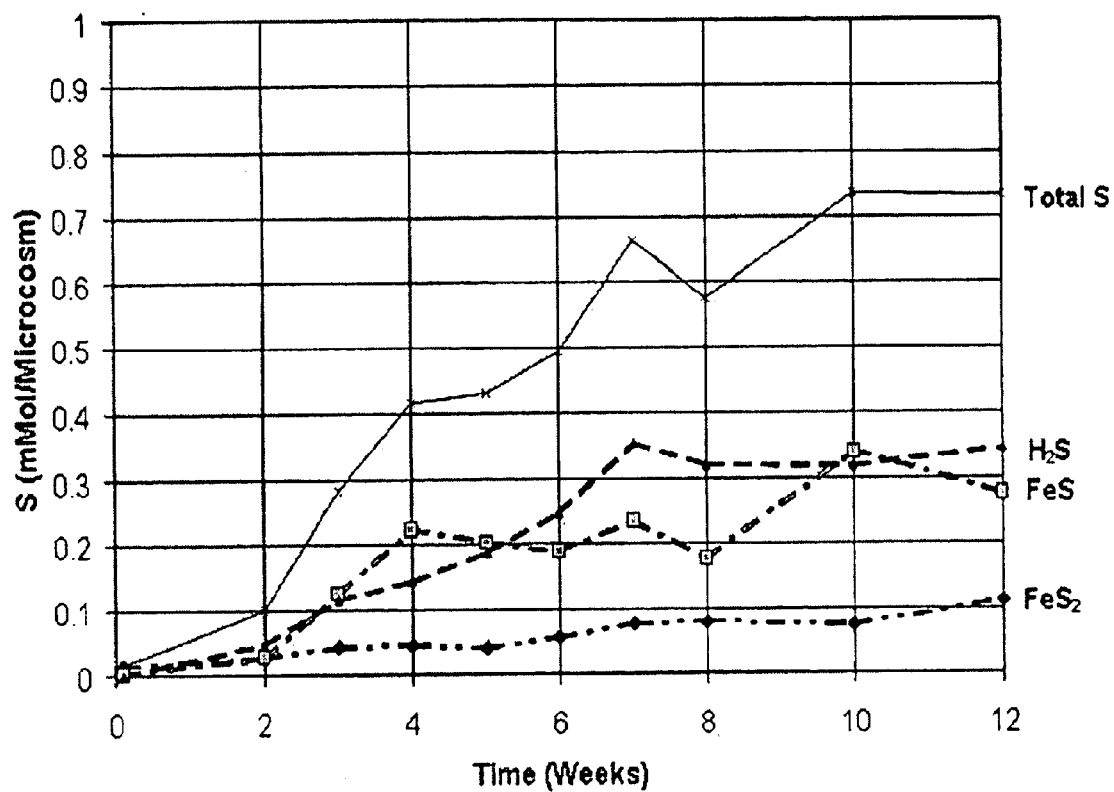
FIG. 1 is a graphic representation of a first laboratory tests involving native sediment amended with acetate and sulfate showing the generation of FeS along with a nonreactive mineral form $FeS_2$ and some associated non-reacted $H_2S$.

Chlorinated solvents and other ground and water contaminants, including toxic heavy metals, have become increasingly known public hazard. Both public and private corporations, having become aware of such hazards have searched for methods and technology to abate the contamination to soil and water recently, which had been improperly or inadvertently introduced to the soil, seeping into the ground water, lakes and streams and public drinking supplies. These water contaminants most noted are often oxidized compounds and more specifically chlorinated solvents, including perchlorate, perchloroethylene (PCE), trichloroethylene (TCE), and dichloroethylene (DCE), which are recalcitrant to microbial degradation. Also, as recently come to light, heavy reactive metals, including hexavalent chromium, are know health hazards, resulting in cancer, soft tissue disease and birth defect. These chemicals tend to persist in an aqueous environment, primarily due to their being a poor substrate for heterotrophic bacteria that conserve chemical energy, such as ATP redox reactions oxidizing a reduced organic (aliphatic compounds) and reducing an external electron acceptor (oxygen).

In order to treat and reduce this contamination, the invention consists primarily of a method and process for the creation of a reduced mineral barrier, or specifically, an iron sulfide microbial geochemical treatment zone using sulfide reducing bacteria to treat toxic and harmful contaminants in groundwater and in the soil. Although direct microbial degradation of the contaminants of concern is difficult, sulfate reduction is relatively simple to stimulate in the subsurface and the resulting activated minerals arising from microbial geochemical reactions can then treat the contaminants by largely abiotic chemical reactions. This process, as shown in FIGS. 3–6, involves locating a contamination zone in soil and ground water containing a target contaminant, introducing a quantity of labile organic compound to the contamination zone, potentially adding a sulfate reducing heterotrophic soil bacteria to the contamination zone, oxidizing the organic while reducing a naturally occurring sulfate present within the soil and ground water, adding additional sulfate to the contamination zone, if needed, to complete the redox reactions where the naturally occurring sulfate is insufficient, producing a quantity of HS within the contamination zone, which in turn reacts with a naturally occurring iron (III) present within the contamination zone forming a deposit of iron monosulfide (FeS) within the contamination zone, the iron sulfides oxidizing the target contaminant while creating an iron sulfide microbial geochemical treatment zone further oxidizing any target remaining contaminant which may pass through or present itself within the iron sulfide microbial geochemical treatment zone swept into such treatment zone via ground water advection, dispersion, or molecular diffusion.

The general chemical equations below indicates the chemical reaction occurring during the above disclosed process as related to the treatment of a polychlorinated solvent, in general is as follows:

(1) $CH_2O + SO_4^{2-} \rightarrow HCO_3^- + H_2S$ (g), the H$_2$S disassociating into reactive HS$^-$:

(2) $FeOOH (s) + HS^- \rightarrow FeS (s) + S^0 + H_2O + OH^-$, which then can oxidize the oxidized compound as follows:

(3) $Fe_xS_y + C_2HCl_3 + H_2O \rightarrow Fe(OH)_3 + SO_4^{2-} + C_2H_2 + Cl^- H^+$.

In the below example, wherein iron monosulfide is utilized and applied specifically to TCE:

(2) $2CH_2O + SO_4^{2-} \rightarrow 2HCO_3^- + H_2S$ (g), the H$_2$S disassociating into reactive HS$^-$:

(3) $2FeOOH (s) + 3HS^- \rightarrow 2FeS (s) + S^0 + H_2O + 3OH^-$, which then can oxidize TCE as follows:

(4) $4FeS + 9C_2HCl_3 + 28H_2O \rightarrow 4Fe(OH)_3 + 4SO_4^{2-} + 9C_2H_2 + 27Cl^- + 35H^+$.

[Full or partial oxidation of the iron monosulfide; full or partial reduction of the polychlorinated hydrocarbon.]

Typical soils and shallow aquifers contain substantial quantities of mineral iron (III) or Fe$^{3+}$ including ferrhydrate, iron hydroxide, geothite, hematite and others. The liberated sulfides, from equation (1) can combine with the mineral Fe$^{3+}$ to form the FeS as per equation (2). It should be noted that a wide range of reduced metals and metal sulfides can be created by reaction with the hydrogen sulfide which will vary in their reactive properties. Biologically generated FeS or other reduced minerals can then oxidize the chlorinated solvent or other oxidized contaminants similar to equation (3). The chlorinated solvents contemplated for reduction by this process include primarily, oxidized compounds, perchlorate, vinyl chloride, perchloroethylene (PCE), trichloroethylene (TCE), and dichloroethylene (DCE), but may also include other less identified and problematic chlorinated solvents or oxidized metals.

Figure 2:
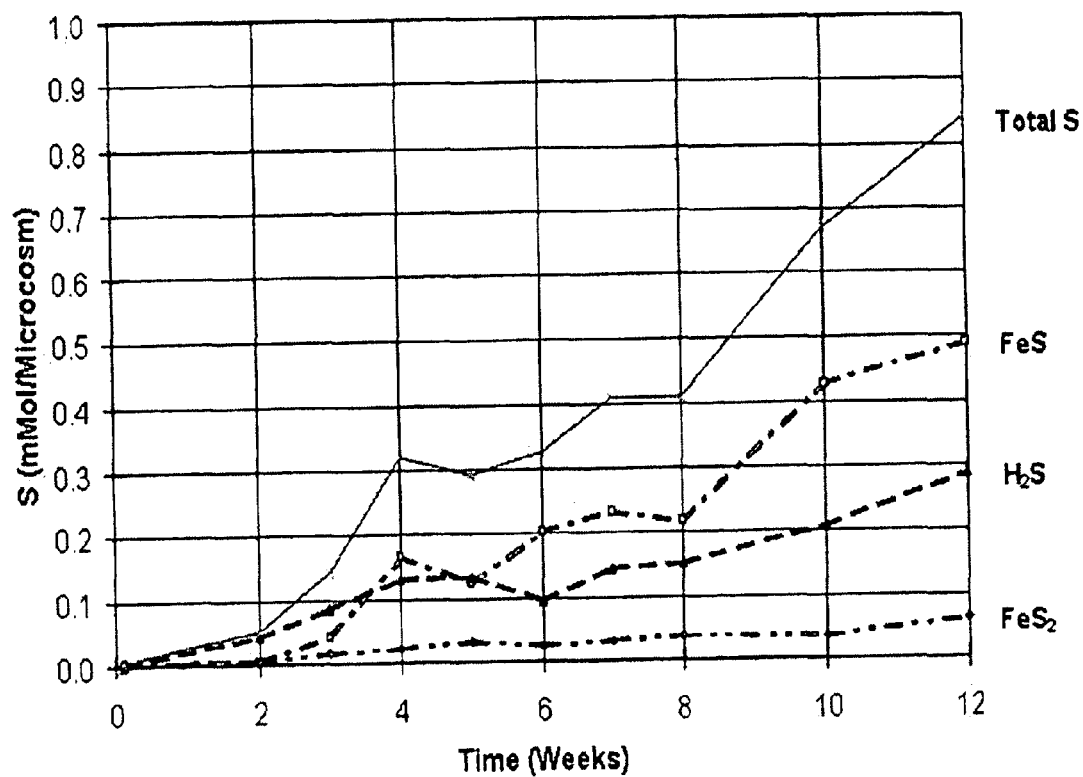
FIG. 2 is a graphic representation of a first laboratory tests involving native sediment amended with acetate and sulfate showing the generation of FeS along with a nonreactive mineral form FeS$_2$ and some associated non-reacted H$_2$S.
Figure 3:
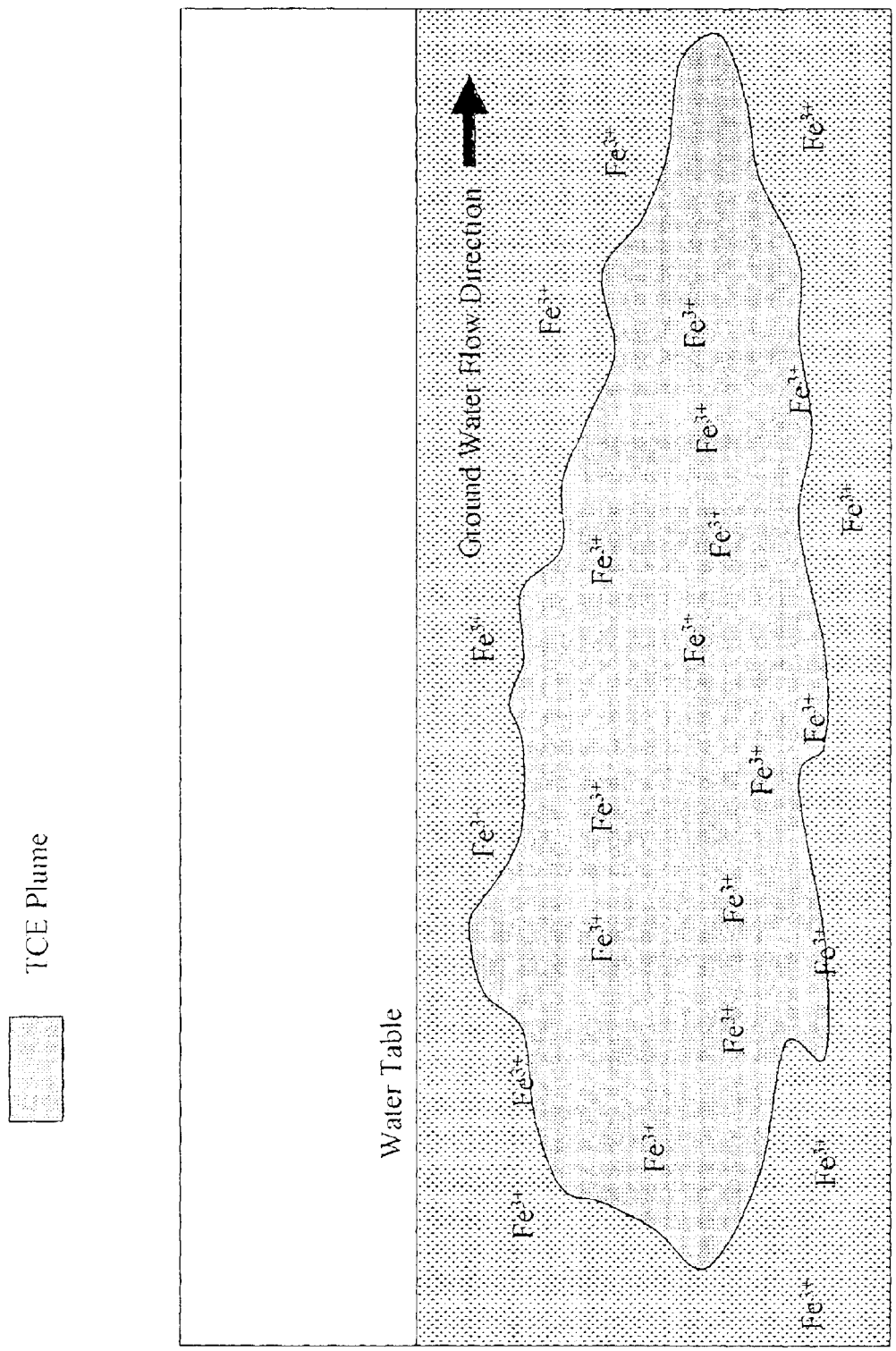
FIG. 3 is a diagram of an aquifer at pre-injection with TCE contamination and native mineral Iron (III), with or without sufficient quantity of sulfate.
Figure 4:
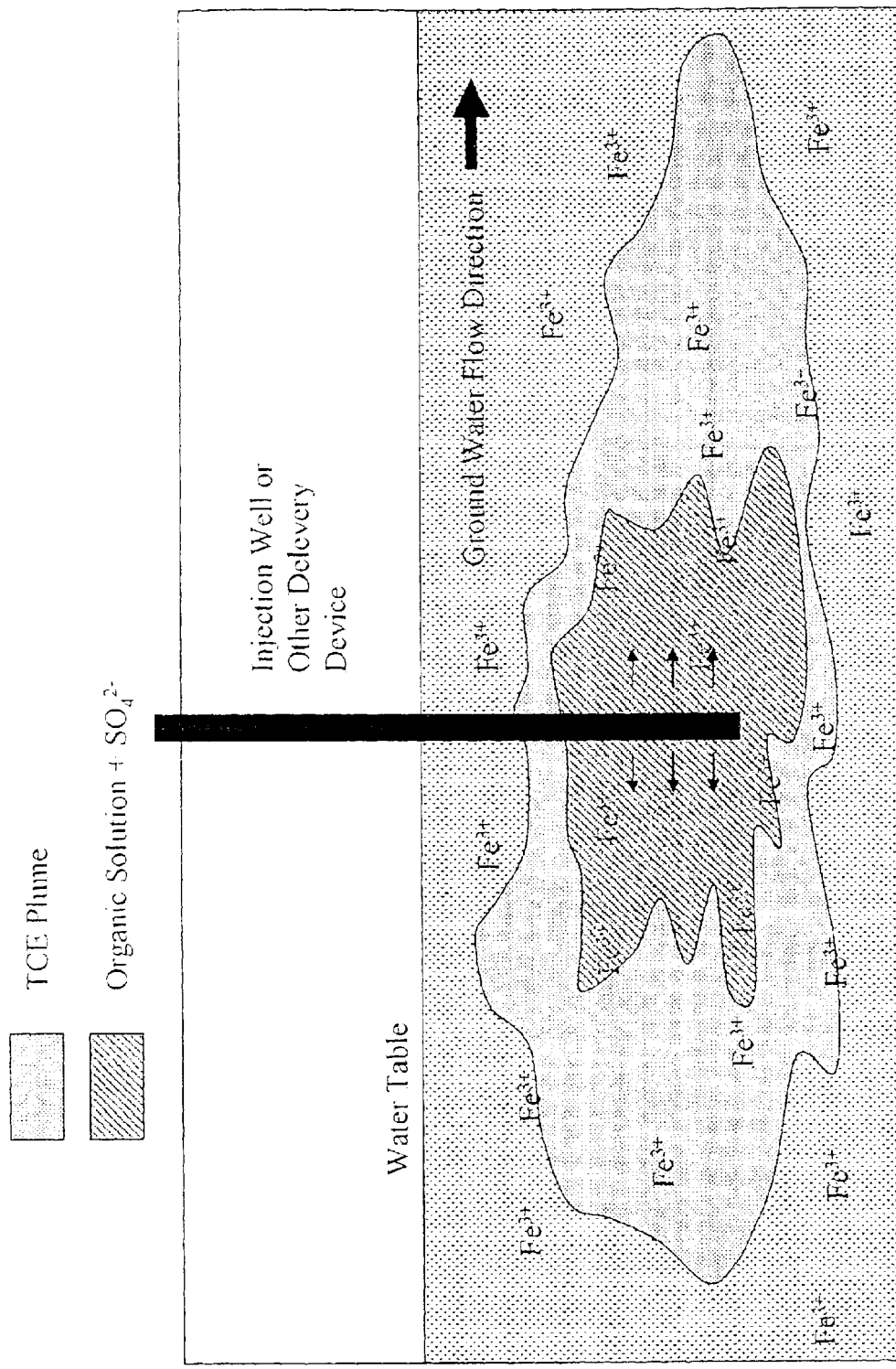
FIG. 4 is a diagram of the injection of the organic and sulfate into the contaminated aquifer.
Figure 5:
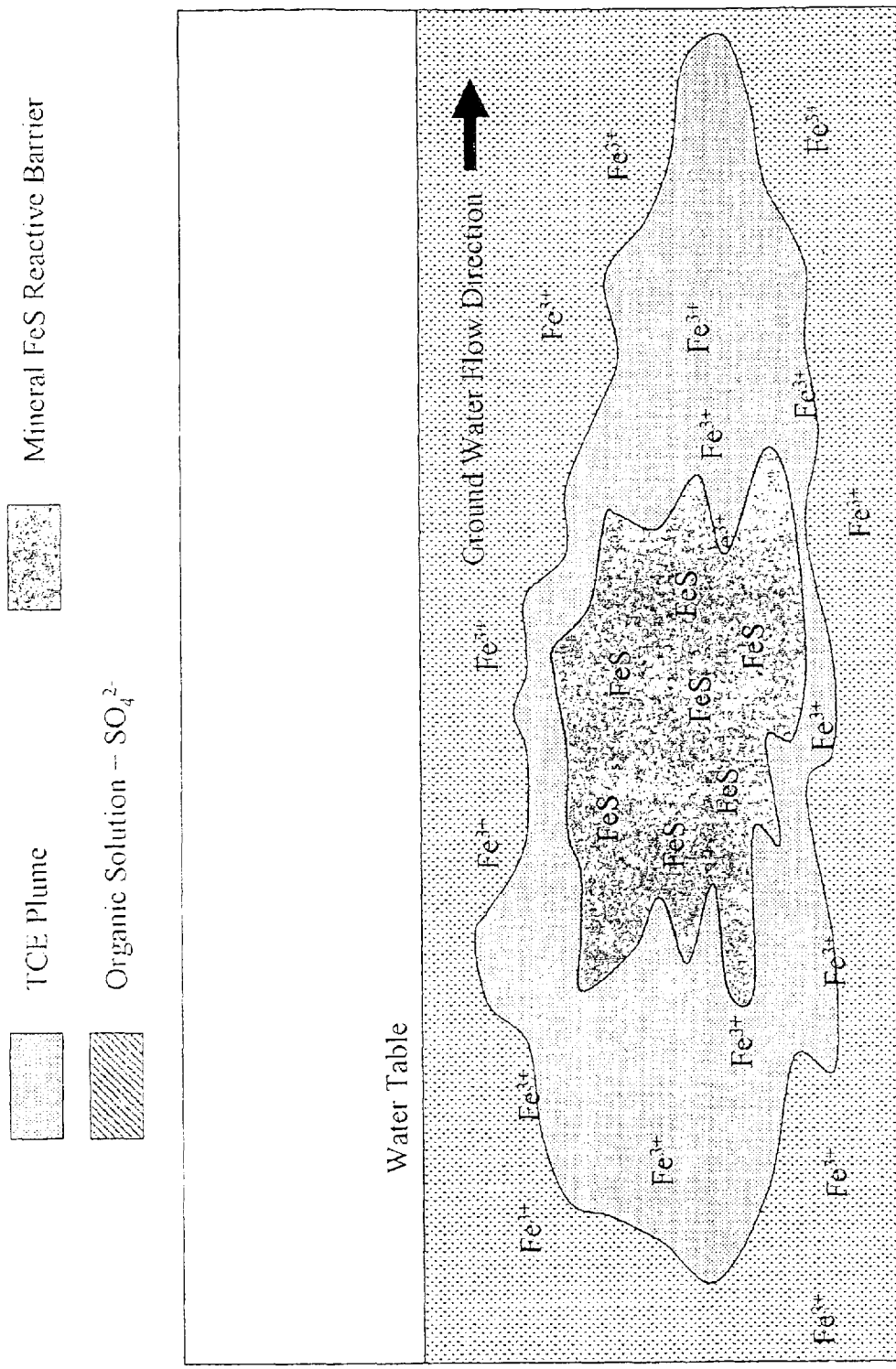
FIG. 5 is a diagram of the removed injection and the formation of the Iron Sulfide created by the oxidation of the organic with the Sulfate, the Iron Sulfide produced from the reactive Hydrogen Sulfide and the Iron (III).
Figure 6:
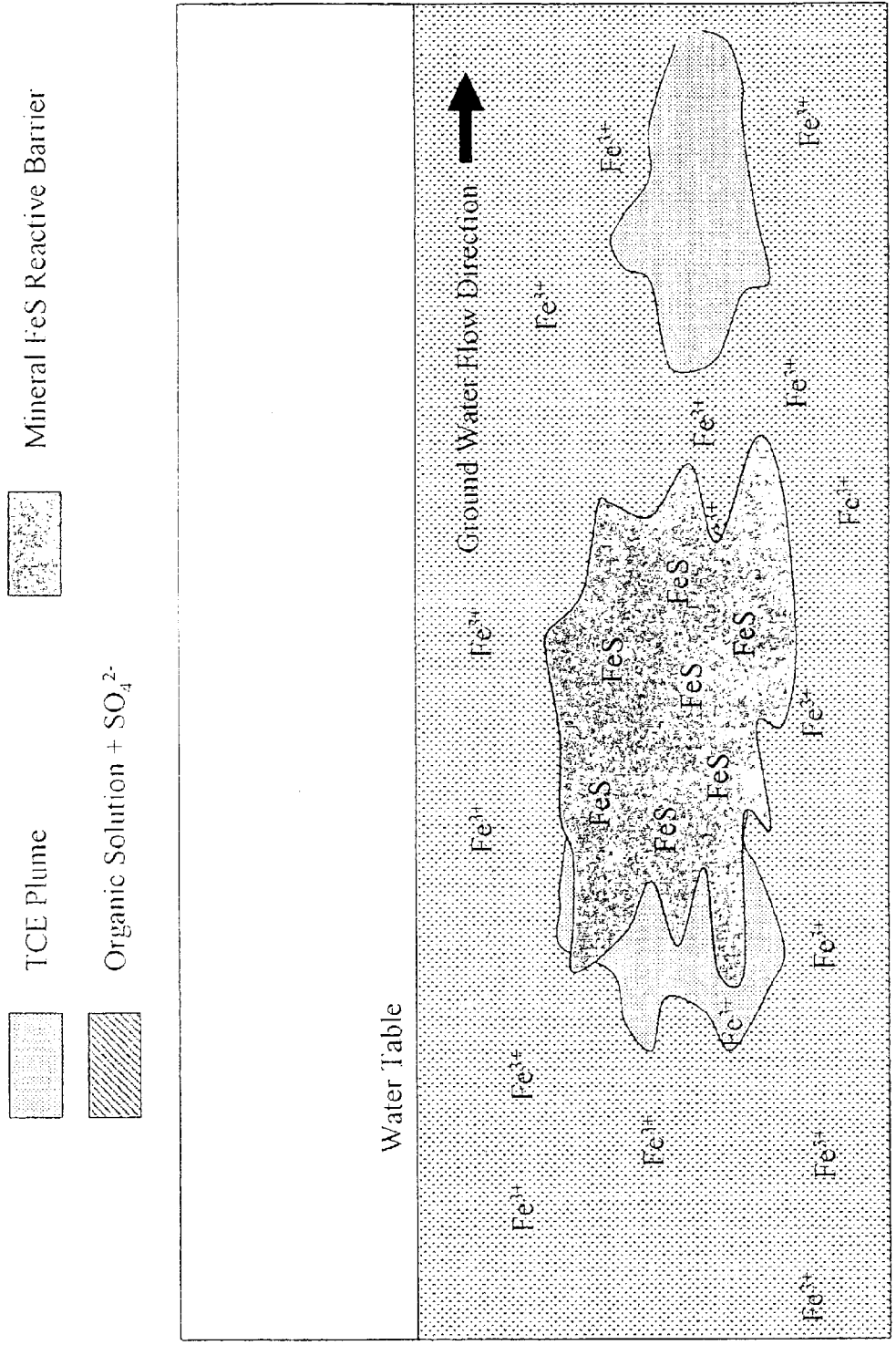
FIG. 6 is a diagram of the TCE oxidized by the Iron Sulfide, indicating the formed geochemical treatment zone, severing the TCE contamination from the source, the remaining source TCE swept into the barrier by ground water advection and dechlorination.

Laboratory testing results, as shown in FIGS. 1 and 2 of the drawings, verify the formation of the iron monosulfide (FeS) and other iron sulfides from the above disclosed process, such laboratory tests performed in using native sediments from two locations within the State of Oklahoma, amended with simple organic acids and sulfate. The charts show the generation of iron monosulfide (FeS), along with a less mineral form iron disulfide (FeS$_2$) and some associated hydrogen sulfide (H$_2$S) that did not fully react in the small containers within which the tests were performed.

Precipitation of Fe$_x$S$_y$ is similar to the creation of a permeable reactive wall, but using geomicrobilogical processes. Generated Fe$_x$S$_y$ resides in the aquifer as a permeable, chemically reactive zone in mineral solids. This zone can then capture and treat chlorinated solvents that may be swept into the treatment area via ground water advection, dispersion, or molecular diffusion.

Iron monosulfide (FeS) have been demonstrated to react with chlorinated solvents including trichloroethylene (TCE) and tetrachloroethylene (PCE) to facilitate complete dechlorination. See Butler, E. C., Kinetics of the transformation of trichloroethylene and tetrachloroethylene by iron sulfide, supra. As stated within that article, iron monosulfide (FeS) chemically reacts with these chlorinated solvents to form ~75% acetylene and ~ethane, ethane or other C$_2$–C$_6$ compounds. Noteworthy is the absence of vinyl chloride (VC) produced in this reaction, nor is there any accumulation of dichloroethylene (DCE) in this reaction, as the suggested pathway for trichloroethylene (TCE) oxidation is via cis dichlorovinyl radical directly to acetylene. In previous test conditions, trichloroethylene (TCE) was degraded in this manner according to pseudo first order decay with a rate of 1.49 E–3 h$^{-1}$ of 0.036 d$^{-1}$. This rate equates to a half life of approximately 19 days, which is comparably and obviously quite rapid.

It is also predicted that this process will also effectively remove dangerous and hazardous heavy metal contaminations (X), as follows:

$$XO_4^{2-}+CH_2O+H^+ \rightarrow CO_2+X(OH)_3+H^+$$

As applied to reactive hexavalent chromium (Cr VI) the following chemical equation would be:

$$4CrO_4^{2-}+3CH_2O+16H^+ \rightarrow 3CO_2+4Cr(OH)_3+8H^+$$

[wherein the hexavalent chromium (Cr VI) is reduced by the iron monosulfide (FeS) found within the iron monosulfide microbial geochemical treatment zone.]

Under some conditions, dissolved sulfate ($SO_4^{2-}$) can be supplemented to ground water during the addition of the labile organic, where insufficient quantities of naturally occurring sulfate ($SO_4^{2-}$) exists. The quantities of organic and sulfate ($SO_4^{2-}$) must be tailored to individual contamination zones to meet contaminant mass constrains. The determination of such quantities of organic and sulfate ($SO_4^{2-}$) may be determined by pre-application soil testing or by continual soil testing and monitoring after the process has been performed within the contamination zone until the contamination zone is eradicated of the involved contaminants.

Although the embodiments of the invention have been described and shown above, it will be appreciated by those skilled in the art that numerous modifications may be made therein without departing from the scope of the invention as herein described.

I claim:

1. A process for the creation of an iron sulfide microbial geochemical treatment zone to treat toxic and harmful contaminants in ground water and in the soil, the process comprising the steps of:

(A) locating a contamination zone in soil and ground water containing a target contaminant;

(B) introducing a quantity of labile organic compound to the contamination zone;

(C) adding a sulfate reducing heterotrophic soil bacteria to the contamination zone, oxidizing the organic while reducing a naturally occurring sulfate present within the soil and ground water;

(D) adding additional sulfate to the contamination zone to complete the redox reactions where the naturally occurring sulfate is insufficient, producing a quantity of HS within the contamination zone, which in turn reacts with a naturally occurring iron (III) present within the contamination zone;

(E) forming a deposit of an iron sulfide ($Fe_xS_y$) within the contamination zone;

(F) oxidizing the target contaminant; and (G) contemporaneously creating an iron sulfide microbial geochemical treatment zone further oxidizing any target remaining contaminant which may pass through or present itself within the iron sulfide microbial geochemical treatment zone swept into such treatment zone via ground water advection, dispersion, or molecular diffusion.

2. The process of claim 1, wherein said process is applied to chlorinated solvents comprising the general chemical series equations of:

1. $CH_2O+SO_4^{2-} \rightarrow HCO_3^-+H_2S$ (g), the $H_2S$ disassociating into reactive $HS^-$:

2. $FeOOH$ (s)$+HS^- \rightarrow FeS$ (s)$+S^0+H_2O+OH^-$, which then oxidizes a chlorinated solvent as follows:

3. $Fe_xS_y$+chlorinated solvent+$H_2O \rightarrow Fe(OH)_3+SO_4^{2-}+C_2H_2+Cl^-+H^+$, with full or partial oxidation of the $Fe_xS_y$ and full or partial reduction of the chlorinated solvent.

3. The process of claim 1 wherein said target contaminant is selected from the group consisting of perchlorate, perchloroethylene (PCE), trichloroethylene (TCE), and dichloroethylene (DCE).

4. The process of claim 1, wherein said process is applied to reduce heavy metal (X) contaminations within the soil and ground water, resulting in the following general chemical reaction:

$$XO_4^{2-}+CH_2O+H^+ \rightarrow CO_2+X(OH)_3+H^+.$$

5. The process of claim 1, wherein the resultant iron sulfide (FeS) forming the iron sulfide microbial geochemical treatment zone reduces a hexavalent chromium (Cr VI) per the general chemical equation of:

$$4CrO_4^{2-}+3CH_2O+16H^+ \rightarrow 3CO_2+4Cr(OH)_3+8H^+.$$

6. A process for the creation of an iron monosulfide microbial geochemical treatment zone to treat toxic and harmful contaminants in ground water and in the soil, the process comprising the steps of:

(A) locating a contamination zone in soil and ground water containing a target contaminant;

(B) introducing a quantity of labile organic compound to the contamination zone;

(C) adding a sulfate reducing heterotrophic soil bacteria to the contamination zone, oxidizing the organic while reducing a naturally occurring sulfate present within the soil and ground water;

(D) adding additional sulfate to the contamination zone to complete the redox reactions where the naturally occurring sulfate is insufficient, producing a quantity of HS within the contamination zone, which in turn reacts with a naturally occurring iron (III) present within the contamination zone;

(E) forming a deposit of an iron monosulfide (FeS) within the contamination zone;

(F) oxidizing the target contaminant; and (G) contemporaneously creating an iron monosulfide microbial geochemical treatment zone further oxidizing any target remaining contaminant which may pass through or present itself within the iron monosulfide microbial geochemical treatment zone swept into such treatment zone via ground water advection, dispersion, or molecular diffusion.

7. The process of claim 6, applied to chlorinated solvents comprising the general chemical series equations of:

(4) $2CH_2O+SO_4^{2-} \rightarrow 2HCO_3^-+H_2S$ (g), the $H_2S$ disassociating into reactive $HS^-$:

(5) $2FeOOH$ (s)$+3HS^- \rightarrow 2FeS$ (s)$+S^0+H_2O+30H^-$, which then oxidizes TCE as follows:

(6) $FeS + \text{chlorinated solvent} + H_2O \rightarrow Fe(OH)_3 + SO_4^{2-} + C_2H_2 + Cl^- + H^+$, with full or partial oxidation of the FeS and full or partial reduction of the chlorinated solvent.

8. The process of claim 6 wherein said target contaminant is selected from the group consisting of perchlorate, perchloroethylene (PCE), trichloroethylene (TCE), and dichloroethylene (DCE).

9. The process of claim 6, wherein said process is applied to reduce heavy metal (X) contaminations within the soil and ground water, resulting in the following general chemical reaction:

$$XO_4^{2-} + CH_2O + H^+ \rightarrow CO_2 + X(OH)_3 + H^+.$$

10. The process of claim 6, wherein the resultant iron monosulfide (FeS) forming the iron monosulfide microbial geochemical treatment zone reduces a hexavalent chromium (Cr VI) per the general chemical equation of:

$$4CrO_4^{2-} + 3CH_2O + 16H^+ \rightarrow 3CO_2 + 4Cr(OH)_3 + 8H^+.$$

* * * * *